Nov. 16, 1943.  W. J. MILLER  2,334,640
METHOD OF APPLYING CLAY TO JIGGERING MOLDS
Original Filed July 20, 1935
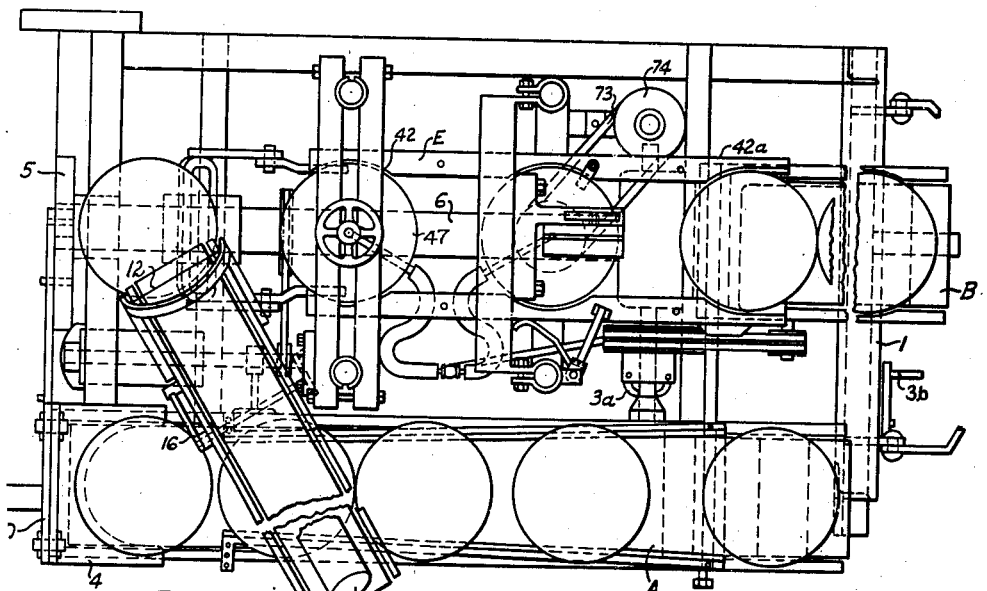
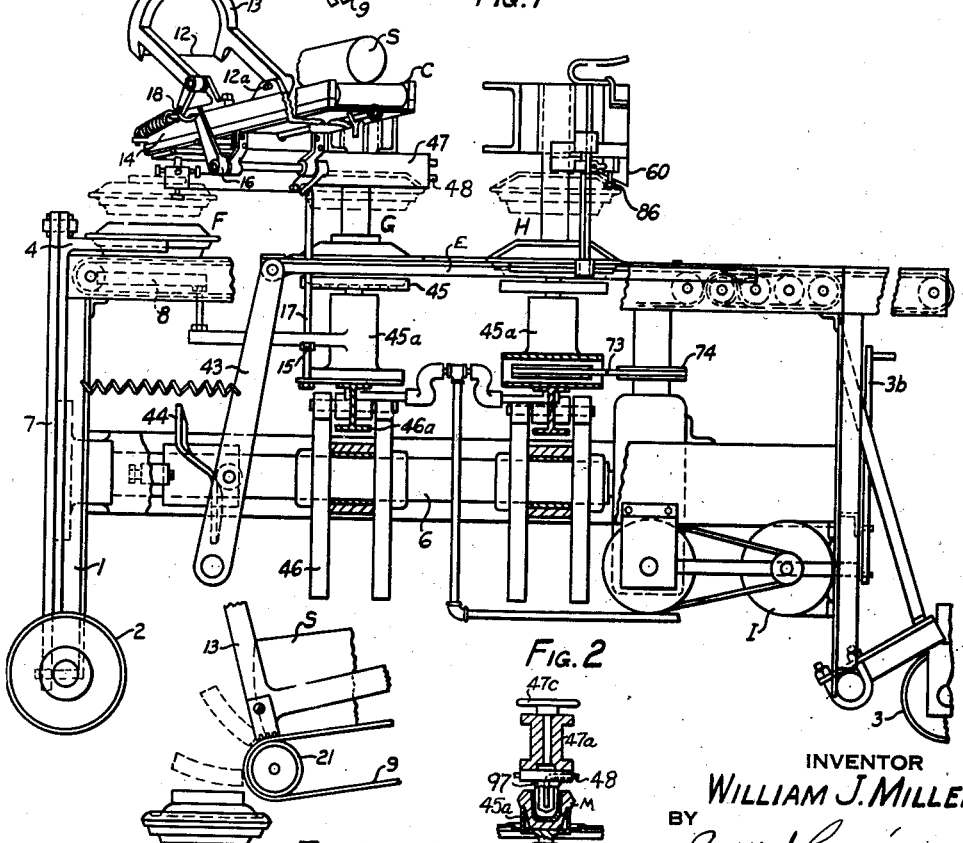
INVENTOR
WILLIAM J. MILLER
BY
ATTORNEY Patented Nov. 16, 1943

2,334,640

UNITED STATES PATENT OFFICE 2,334,640

METHOD OF APPLYING CLAY TO JIGGERING MOLDS

William J. Miller, Swissvale, Pa.

Original application July 20, 1935, Serial No. 32,391. Divided and this application March 18, 1940, Serial No. 324,468

14 Claims. (Cl. 25—156)

This invention relates to a method of the manufacture of pottery ware, such as cups, saucers and the like known in the art as "dinnerware" from plastic adhesive clay as used in manual jiggering. It has to do with new and improved methods of ware production.

This application is a division of my co-pending application for United States Letters Patent, Serial No. 32,391 filed July 20, 1935 and relates particularly to the method of forming and applying clay charges to jiggering molds.

The objects are to provide new and improved automatic ware fabricating methods and means which will displace the "batter-out" in the normal jigger crew; to automatically form and apply charges to molds; to manufacture superior quality ware free from dirt, specks and drying cracks in the display surfaces thereof.

In the drawing, Fig. 1 is a top plan view of a fabricating machine for practicing my method.

Fig. 2 is a side elevation of the machine shown in Fig. 1.

Fig. 3 is a detail view showing how charges of clay are segregated and disposed on molds, and Fig. 4 shows a hollow ware press.

According to the general system of my application supra, ware is fabricated progressively in or on absorbent molds, the operations of forming and feeding charges, spreading the charge over the mold surface; adhesively bonding the clay to the mold, jiggering and trimming, all performed mechanically on automatic machinery. The molds are preferably transported manually from a dryer and placed on a conveyor from which each is subsequently removed and automatically fed first to the charge applying means and thereafter to a succession of fabricating stations for procedural steps leading to the completion of the article undergoing production after which it is removed to a dryer.

The preferred apparatus, Fig. 1, comprises generally, a frame 1 having a three-point support on wheels 2, to avoid torsional stresses, one of which at 3 is swivelled to facilitate directional travel and placement adjacent a dryer. The frame supports drive motor I, a pair of elongated mold conveyors A and B respectively; a charge forming and feeding means C; a mold transfer D for automatically feeding empty molds from conveyor A to position F for charging; another transfer E progresses charged molds to and through the die forming station G; profiling and trimming station H and onto conveyor B, both of said transfers operating in timed relation with each other and with conveyors A and B; the apparatus also including crossheads 46a and mounting chucks 8 and 45a for elevating the molds to operating position. The machine operates in repeated cycles and upon completion of each cycle a finished piece of ware in or on its mold is transferred to conveyor B, the molds accumulating thereon against the time when the operator will remove the same to the dryer.

Normally, the operator places a billet of clay S on feeder belt 9 and manually advances it to correct cutting position and then loads the belt to capacity with reserve billets, welding the ends together. He then loads empty molds on conveyor A to capacity and clutches in the drive through lever 3b and clutch 3a, whereupon empty molds are automatically transferred in consecutive order to and through stations F, G and H, the operator continuing to place empty molds on conveyor A until filled molds appear on conveyor B, in sufficient numbers to require, in the operator's judgment, removal.

When conveyor A moves left a predetermined distance, the brim of the lead mold M is centered automatically in seat 4 of transfer D. The frame 4 is shifted to left, Fig. 1, by cam 5 on drive shaft 6 driven by motor I through parallel levers 7 to automatically transfer a mold from conveyor A to centered position over ring chuck 8. The chuck is then elevated through double cam 46, crosshead 46a, and engages the mold through the open bottom of frame 4, elevating it to charging position adjacent the lead end of feeder belt 9 (see dotted lines, Fig. 2) whilst frame 4 is returned to its initial position.

The preferred billet form is that of a relatively large diameter elongate cylinder having mitered ends which represents a maximum volume for a minimum peripheral surface area. By severing slices from the lead end of the slug, a disc-like charge is produced, having a maximum area of clean clay and a minimum exposed area (in the periphery) of contamination. This contamination is principally in the form of microscopic iron particles that are detached from the surfaces of the knives, screw and pug nozzle by the highly abrasive action of the clay and are normally deposited in the billet skin. If this skin is laid against the mold face or if the clay is masticated during charge formation, the particles are scattered throughout the ware and upon firing become visible as "off color" specks in the display surfaces. My improved method confines contamination to the ware brim zone, generally removed by the trimmer or at least covered by decorations.

A clay slice of measured thickness is severed on the bias in overbalanced position by adjustable cutting wire 12 (see Fig. 3) which may be heated, dried or wiped of adhering clay to remove accumulation, to reduce its cut sealing characteristics and insure free drop of the slice. The wire is preferably oscillated in a predetermined substantially rectilinear path by frame 13 having a shifting pivot in elongated bearings 12a attached to feeder frame 14, and connected to an actuating crank 16, Fig. 2, by elastic members 18. This crank is operated in unison with crosshead 46a, the position and extent of reciprocation being determined by the adjustment of nuts 15 on connecting rod 17.

By severing charges on the center of a crowned roller 21 in overbalanced position directly against the belt (Fig. 3), the slice may be guided directly onto the mold according to the dotted line disclosure of Fig. 3 with the farther rim portion of the slice face first engaging the mold.

After the mold is charged at F and lowered onto the end seat 42 of transfer E, the transfer is shifted to right, Figs. 1 and 2, by levers 43, and cam 44 on the shaft 6 to advance the mold to the blank forming station G. The transfer may be quickly adjusted to accommodate molds of other size by removing the dowelled bars 42a and substituting bars having mold seat portions of correct size. Chuck 45 on stand 45a is then elevated by peak cams 46 and crosshead 46a, lifting the mold into co-operation with a stationary non-adhesive die 47, which engages, progressively spreads and adhesively bonds the clay to the mold. The charge preferably is in the form of a disc and lies in centered or approximately centered position on the mold covering only a portion of the ware forming surface; upon engagement with the die, the material is spread radially and evenly until the ware surface is completely covered, the contaminated slice brim flowing to the mold brim and subsequently being trimmed or cracking off during drying.

After the clay is applied to the mold and adhesively bonded thereto, the mold is advanced by transfer E to the profile station H, where it is rotated through belt and pulley 73 and 74 in engagement with the tool 60 whilst fluid is applied, thereby removing excess material from and smoothing and finishing the surface of the clay, whilst the mold is rotated, a trimming tool 86 trims the brim and upon termination of the profiling operation the mold is returned to conveyor E which shifts to the right and loads the mold onto conveyor B, operating in timed relation with conveyor A. The molds are subsequently transferred to a dryer, all substantially as described more in detail in my co-pending application supra.

The charge preferably is in the form of a disc and lies in centered or approximately centered position on the mold covering only a portion of the ware forming surface; upon engagement with the die, the material is spread radially and evenly until the ware surface is completely covered, the contaminated slice brim flowing to the mold brim and subsequently being trimmed or cracking off during drying.

As distinguished over manual, wherein the clay is first "batted out" into a pancake oversize as to the diameter and thickness of the completed ware, independently of the mold on which it is formed and then applied thereto; the clay charge is deposited directly on the mold as it is severed from the parent mass and is then spread or diffused over the ware forming surface of the mold (by a die which in effect is a batting out head) to fully cover the same, thus eliminating the normal batting out procedure and considerably shortening the period necessary for completion of the piece. In effect, this amounts to "batting out" directly on the mold but without the abnormal excess of the manual routine, or the additional procedural steps.

In addition to this, the application of force in spreading and applying the clay over the exposed surface of the mold provides a mechanical bond of increased efficiency both as regards capillarity and resistance to dislodgement under the higher speeds of mold rotation common to automatic equipment of this type.

In making hollow ware such as cups and the like, the molds which are cavitous, as shown at M, in Fig. 4, are brought to the feeding position and there charged with clay in the manner aforesaid and are then transported to the press position where the clay charge is engaged by non-adhesive contour press member 97 upon elevation of the chuck 45a on pedestal 45. The die is supported on the lintel 47a of the machine in place of the flat ware die shown in Fig. 1. It has a threaded mounting stem on which is mounted a hand wheel 47c by means of which it is attached to the lintel. 48 indicates the conduit by means of which steam is piped to the hollow interior.

The clay charge which occupies a position preferably in the center of the bottom of the mold cavity is spread up the cavity wall incident to pressing, the clay flowing vertically and to a certain extent radially by virtue of the inclination of the cavity wall.

Having thus described my invention, what I claim is:

1. A method of applying clay to the molding surface of pottery jigger molds, which comprises, advancing a cylindrical body of clay containing material for several mold charges downwardly toward a cutting off position, slicing charges of clay from the leading end of the body and by gravity, depositing the slices as they are cut off, on the molding surface of successively presented molds in substantially centered position and then spreading out the clay over the molding surface by pressing the clay with a die preformed to be complementary to the molding surface of the mold.

2. The method of applying clay to the molding surface of a plaster jiggering mold in the manufacture of articles of pottery ware which comprises, providing a cylindrical mass of clay, slicing charges of clay in consecutive order from one end thereof said charges being of disc-like proportions and smaller diameter than the molding surface of the mold but containing ample material for the formation of the ware piece, dropping the charge by gravity incident to segregation on substantially the center of distribution of the mold, pressing the charge between the mold and a non-rotatable preforming die thereby spreading out the charge radially and brimwise to cover exposed portions of the molding surface and adhesively bond the charge thereto.

3. The method of feeding and applying clay to absorbent jiggering molds in the manufacture of pottery ware which comprises, providing a substantially cylindrical body of clay containing within the mass thereof a multiple of mold charges the cross sectional dimension thereof being smaller than the diameter of the molding surface of the mold, slicing the aforesaid mass across the long axis thereof in order to produce a substantially disc-like body having substantially flat top and bottom surfaces, depositing the aforesaid charge incident to the segregation thereof from the parent mass on the molding surface of the mold, said charge being located in substantially the center of distribution thereof but covering only a portion of said molding surface and then pressing the aforesaid charge between the mold and a matrix to spread the clay radially over exposed portions of the mold.

4. The method of feeding and applying clay to plaster jiggering molds in the manufacture of jiggered pottery ware which comprises, providing a solid column of clay containing a multiple of mold charges, advancing the aforesaid body in the direction of the long axis thereof toward a point of charge segregation and there slicing charges of clay from the aforesaid mass by cutting crosswise of the long axis, said charge thus produced being of disc-like proportions and having substantially flat top and bottom surfaces with the material therein uniformly distributed from the center to the brim, depositing said charge on substantially the center of distribution of the mold incident to segregation, said mold being positioned so as to receive said charge upon segregation and thereafter pressing the charge of clay between the mold and a preforming die to spread out the clay brimwise in all directions substantially simultaneous to cover the exposed portions of the molding surface.

5. The method of feeding and applying clay to absorbent jiggering molds in the manufacture of jiggered pottery ware which comprises, providing a cylindrical body of clay containing a multiple of mold charges, slicing the body crosswise of the long axis thereof to produce a mold charge of substantially disc-like proportions having substantially flat top and bottom surfaces, depositing the aforesaid charge on one of these surfaces on the mold, said charge being of less diameter than that of the molding surface and thereafter pressing the charge between a mold and a non-adhesive matrix to reduce the body in thickness and cause it to spread over the exposed portions of the molding surface said clay flowing radially and brimwise under the pressure exerted.

6. The method of feeding and applying plastic clay to absorbent jiggering molds in the manufacture of jiggered flat ware which comprises, providing in registry with a superimposed body of clay a mold, the molding surface of which is positioned so as to receive a body of clay segregated from said superimposed mass, slicing said mass across the long axis thereof to thereby produce a charge of clay of substantially disc-like proportions of less diameter than the molding surface of the mold, depositing said slice on the center of distribution of the mold, the material in said charge being uniformly distributed from the axial center thereof to the periphery and thereafter pressing the charge between the mold and a non-adhesive matrix to flow the clay radially over the exposed portion of the molding surface and adhesively bond the clay thereto.

7. The method of feeding and applying plastic clay to absorbent jiggering molds in the manufacture of jiggered flat ware which comprises, bringing flat ware molds in succession into registry with a superimposed body of clay containing a multiple of mold charges and in timed relation with the presentation of molds at the charging position, slicing the superimposed body across the long axis thereof to produce in succession clay charges of uniform shape, bulk and thickness, said charges being of less diameter than the molding surface of the molds and having the material therein uniformly distributed from the center toward the perimeter, pressing the charges of clay between the aforesaid molds and a non-adhesive die having a pressing surface complemental to the molding surface of the molds to thereby spread out the material and cover theretofore exposed portions of the molding surface.

8. The method of applying clay to the molding surface of a plaster jiggering mold in the manufacture of articles of pottery ware which comprises, providing a cylindrical mass of clay, slicing charges of clay in consecutive order from one end thereof said charges having a predetermined volume of clay and being of disc-like proportions and smaller diameter than the molding surface of the mold but containing ample material for the formation of the ware piece, depositing the charge concurrently with segregation on substantially the center of distribution of the mold, pressing the charge between the mold and a non-rotatable non-adhesive contoured matrix thereby spreading the charge radially and brimwise to cover the exposed portion of the molding surface and adhesively bond the charge thereto.

9. The method of feeding and applying clay to absorbent jiggering molds in the manufacture of jiggered flat ware which comprises, providing a substantially cylindrical body of clay containing a multiple of mold charges, segregating charges of clay therefrom by slicing the aforesaid cylindrical mass across the long axis thereof said slice being disc-like in shape and of substantially uniform thickness overall, initiating the progress of the slice toward the mold whilst partly attached to the parent body and applying the zone initially detached to the mold first, the remainder progressively dropping into place to thereby expel air between the charge and mold, the bulk of the charge being located within a zone less than the entire area of the molding surface and thereafter pressing the charge of clay between the mold and a non-adhesive matric to thereby flow the clay radially in contact with the molding surface to cover the theretofore exposed areas of the molding surface.

10. In the manufacture of pottery ware, the method of applying a charge of clay to an absorbent jiggering mold which comprises, projecting a mass of clay of cylindrical proportions downwardly toward a mold the lead end of the mass being smaller in diameter than the diameter of the molding surface, slicing the mass crosswise of the long axis at the leading end to produce a charge of clay of circular proportions substantially uniform in thickness, commencing the cut at the periphery and continuing the cut toward the opposite side, the zone initially severed parting from the mass and falling toward the mold and engaging the molding surface in advance of the remainder of the slice to preclude air entrapment, centering the slice of clay on substantially the center of distribution of the mold by locating the mold in proper position as respects the line of fall of the slice and thereafter pressing the slice between the mold and a non-adhesive matrix to expand the clay radially over the exposed surface of the mold.

11. The method of feeding and applying plastic clay to jiggering molds in the manufacture of jiggered pottery ware which comprises, transporting jiggering molds in succession into registry with one end of a superimposed body of clay and concurrent with the presentation of molds at such position, slicing the end of the superimposed body to produce in succession clay charges of uniform shape, bulk and thickness, permitting such charges to gravitate directly onto the molding surface of the mold within the interval such mold is in registry with said superimposed mass of clay, transporting the charged molds in succession to a preforming position and there spreading out the clay with a die having a spreading surface complementary to the molding surface.

12. A method of applying clay to jiggering molds in the manufacture of dinnerware, which comprises slicing from a cylindrical extruded mass of plastic clay, in a plane transverse to its longitudinal axis, a sequence of substantially circular mold charges of uniform thickness and of materially less diameter than the molding surfaces of the molds upon which they are to be fabricated, said charges each containing sufficient material for the fabrication of the ware in question, depositing the charges onto the centers of the molding surfaces of the molds, and thereafter by the application of uniform pressure spreading out the clay of the charges evenly in all radial directions to cover the molding surfaces and bond the clay to the molds.

13. The method of preparing clay charges on plaster jiggering molds for the purpose of making dinnerware which comprises the steps of extruding a mass of plastic clay of cylindrical cross section and of smaller diameter than the molding surface, slicing a sequence of mold charges of a material thickness from the end of the mass, dropping the charges by gravity with a flat side centered on the molding surface, and thereafter pressing the charge in a direction normal to its flat surface to spread the clay uniformly in all radial directions over the molding surface, thereby reducing the thickness of the charge to preshape it on the mold and bond it to the plaster mold surface.

14. A method of applying clay to jiggering molds in the manufacture of dinnerware, which comprises slicing from an extruded mass of plastic clay, having a cross sectional area symmetrical to that of the molding surface of the molds but of less area than the latter, in a plane transverse to its longitudinal axis, a sequence of mold charges of uniform thickness, said charges each containing sufficient material for the fabrication of the ware in question, dropping the charges by gravity onto the molding surfaces of the molds, so that they are symmetrical thereto, and thereafter by the application of uniform pressure spreading the clay of the charges evenly in all radial directions to cover the molding surfaces and bond the clay to the molds.

WILLIAM J. MILLER.